United States Patent [19]

Moriyama et al.

[11] Patent Number: 5,432,468
[45] Date of Patent: Jul. 11, 1995

[54] CLOCK GENERATOR CIRCUIT FOR USE IN A PERSONAL COMPUTER SYSTEM

[75] Inventors: Shuichi Moriyama; Masayuki Shimura, both of Niigata, Japan

[73] Assignee: NEC Corporation, Tokyo, Japan

[21] Appl. No.: 325,153

[22] Filed: Oct. 20, 1994

[30] Foreign Application Priority Data

Nov. 17, 1993 [JP] Japan .................. 5-287901

[51] Int. Cl.[6] .................. H03B 19/00; H03K 3/01
[52] U.S. Cl. .................. 327/152; 327/144; 327/160; 395/550
[58] Field of Search .............. 327/144, 145, 151, 152, 327/160

[56] References Cited

U.S. PATENT DOCUMENTS

| | | | |
|---|---|---|---|
| 4,191,998 | 3/1980 | Carmody | 327/151 |
| 4,677,499 | 6/1987 | Shirota et al. | 327/152 |
| 4,757,264 | 7/1988 | Lee et al. | 327/152 |
| 4,845,437 | 7/1989 | Mansur et al. | 327/145 |
| 5,086,387 | 2/1992 | Arroyo et al. | 395/550 |

*Primary Examiner*—John S. Heyman
*Attorney, Agent, or Firm*—Whitham, Curtis Whitham & McGinn

[57] ABSTRACT

A frequency dividing circuit/delay circuit is provided to generate a plurality of system clock signals according to the combination of frequency division and the delay based on a fast-speed basic clock signal to determine according to the address signal from a central processing unit (CPU) what the operating cycle of the slave is to select a system clock of optimum frequency or duty ratio for that slave. As a result, it becomes possible to shorten the time required for executing one cycle and, hence, to improve the performance of the whole personal computer system.

8 Claims, 4 Drawing Sheets

CLOCK GENERATOR CIRCUIT FOR USE IN A PERSONAL COMPUTER SYSTEM

FIELD OF THE INVENTION

The present invention relates to a clock generator circuit for use in a personal computer system having a master unit and slave unit.

BACKGROUND OF THE INVENTION

A conventional clock generator circuit used in the personal computer system have been designed so that the slaves such as I/O, CRT, memory and the like have been designed to become optimal relative to its clock because while the central processing unit (CPU) as a master is operating (running the cycle) the clock frequency and the duty ratio are constant in the entire computer system.

However, if the optimum design of the slaves is impossible, the conventional clock generator has a drawback that the performance of the personal computer system is degraded. Because the clock generator has to standardize to supply the latest clock signal for operating well the whole computer system having a lot of the slave units. Further, it also has a problem that if the clock standard is changed the slaves designed according to the clock standard used prior to the change cannot be used.

SUMMARY OF THE INVENTION

An object of the present invention is to provide a clock generator circuit which can select a system clock of optimum frequency or duty ratio for a slave unit.

A clock generator circuit according to the present invention comprises a basic clock generator for generating fast-speed basic clock signals, a frequency dividing-/delay circuit for generating a plurality of system clocks from the basic clock signal, an address decoder to which an address signal from the central processing unit is entered for decoding, an address map register for storing the optimum clock parameters each corresponding to each address which is decoded by the address decoder and a clock selector for selecting a system clock of optimum frequency or of optimum duty ratio from among the plurality of system clocks according to the information from the address map register.

A clock generator circuit according to the present invention comprises a basic clock generator for generating a fast-speed basic clock signal, and a clock generative portion wherein a frequency dividing/delay circuit for generating a plurality of system clock signals from said basic clock, an address decoder to which the address signal from a central processing unit is entered for decoding, an address map register for storing the optimum clock parameters each corresponding to each address signal which is the result decoded by said address decoder, and a clock selector for selecting a system clock signal of optimum frequency or duty ratio from among said plurality of system clocks according to the information from said address map register.

Further, the frequency dividing/delay circuit of the clock generator circuit according to the present invention generates a plurality of system clock signals by combining a frequency dividing circuit and a delay circuit based on said basic clock signal.

Furthermore, the address decoder of the clock generator circuit according to the present invention detects what the slave is going to operate by entering said address signal.

Moreover, the address map register of the clock generator circuit according to the present invention generates parameters such as the frequency dividing number and/or delay time of said frequency dividing/delay circuit from the address signal data which is the result decoded by said address decoder.

BRIEF DESCRIPTION OF THE ACCOMPANYING DRAWINGS

DESCRIPTION OF THE PREFERRED EMBODIMENTS OF THE INVENTION

Several embodiments of the present invention are described with reference to the accompanying drawings.

Figure 1:
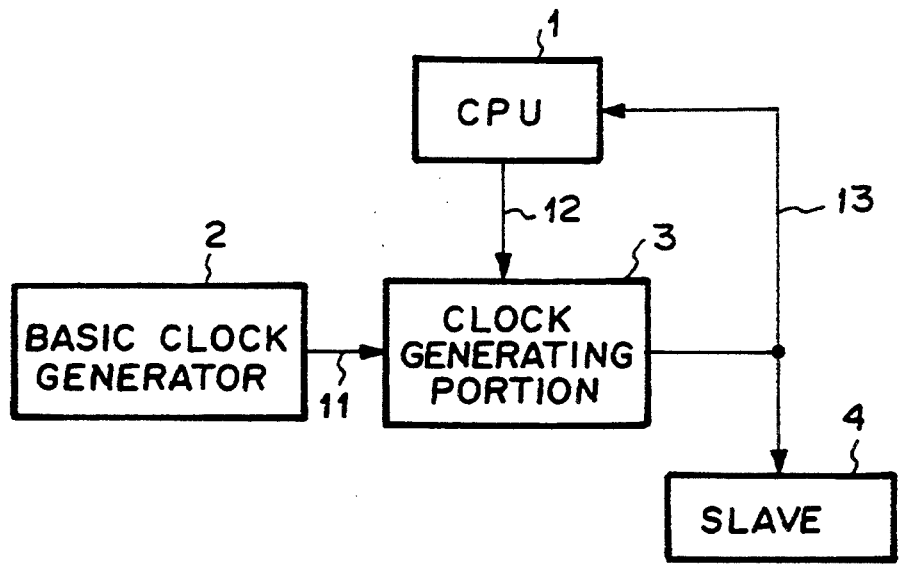
FIG. 1 is a block diagram of a specific embodiment according to the present invention.
Figure 2:
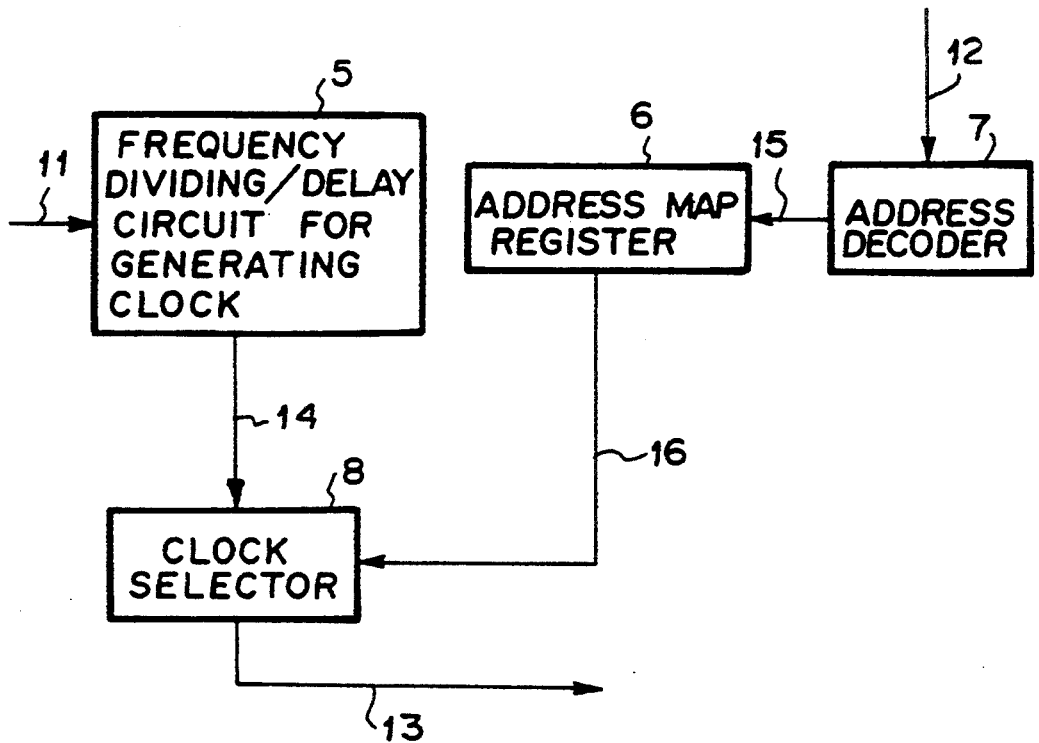
FIG. 2 is a block diagram illustrating the detail of a clock generating portion of FIG. 1.

FIG. 1 is a block diagram of a specific embodiment of the present invention, and FIG. 2 is a block diagram of the details of a clock generator circuit portion of FIG. 1.

Referring to FIG. 2, a fast-speed basic clock signal 11 is supplied to a frequency dividing and delay circuit 5 from a basic clock generator 2 (see FIG. 1). The frequency dividing and delay circuit 5 generates a plurality of system clocks 14 corresponding to the basic clock signal 11. The frequency dividing and delay circuit 5 has a plurality of frequency division circuits, delay circuit and flip-flop circuits to generate the system clocks 14 which have different frequencies or duty ratios. An address signal (CPU address) 12 is entered from a central processing unit (CPU) 1 (see FIG. 1) to an address decoder 7 for decoding, and the address decoder sends the result signal of determining the cycle (mode) of the slave which is to be operated, to an address map register 6 as the decoded result signal 15. Information of the clock parameters each optimal to each slave 4 (see FIG. 1), for example, the frequency or duty ratio is stored within the address map register 6 which, based on the decoded result signal 15, sends the optimum clock parameter of the slave 4 in that cycle to a clock selector 8 as clock parameter information 16. The clock selector 8 selects a corresponding optimum clock from among a plurality of system clocks 14 according to the clock parameter information 16 to send the clock signal 13 out to the slave 4 and the CPU 1. Incidentally, the frequency dividing and delay circuit 5, the address map register 6, the address decoder 7 and the clock selector 8 constitute a clock generating portion 3 (see FIG. 1).

Figure 3:
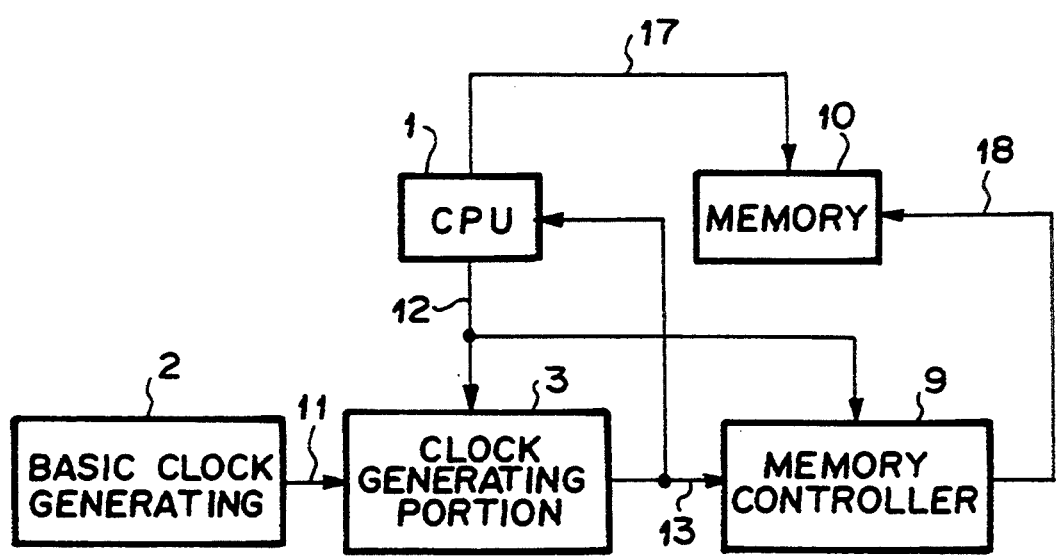
FIG. 3 is a block diagram of a specific example of how the embodiment of FIG. 1 is used.

FIG. 3 is a block diagram of a specific example of how the embodiment of FIG. 1 is used, in which a memory 10 and a memory controller 9 are connected as the slaves 4 of FIG. 1.

Referring to FIG. 3, the basic clock signal 11 is entered to the clock generator portion 3 from the basic clock generator 2, and a CPU address signal 12 is entered from a CPU 1 to the clock generator portion 3. When the current cycle in which the CPU 1 is operating corresponds to one which reads out from the memory 10, the clock generator portion 3 analyzes from the CPU address signal 12 driven by the CPU 1 that the slave of the current cycle corresponds to the memory 10 and the memory controller 9, then selects a clock signal 13 optimal for the memory 10 and the memory controller 9, which are slaves, and supplies the clock signal 13 to the memory controller 9. The memory controller 9 outputs a memory chip select signal 18 synchronizing with the clock signal 13 to the memory 10 making the latter read out data 17.

Next, the operation of this embodiment in the case of FIG. 3 example is described with reference to FIGS. 4 and 5. FIG. 4 is an example in which the reading performance of the memory is improved by optimizing the frequency of the clock signal so as to match the slave.

In FIG. 4, reference mark Ts denotes a starting state, Tc a command state, Tcw a command wait state, Ts shows what the current cycle is, Tc shows an execution state and Tcw shows a state which is added when the cycle is not completed in Tc. Further, a memory chip select signal 18a is asserted at the beginning of the command state Tc rises, and the CPU 1 receives the read out data after a predetermined period of time elapses after it is valid.

Figure 4A:
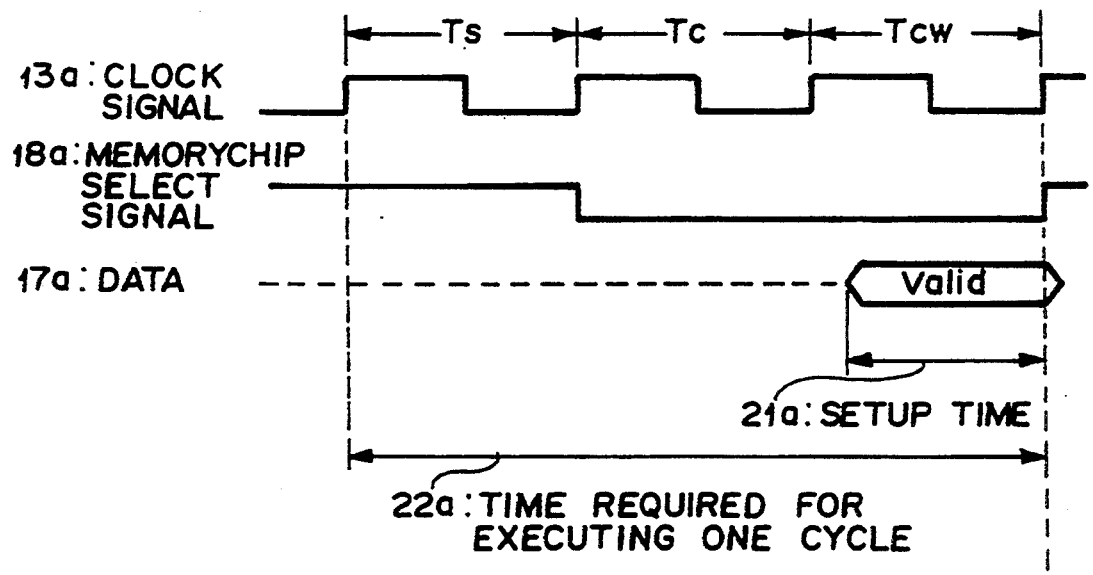
FIG. 4 is a timing chart of the operation as the frequency of the clock signal is optimized illustrated in contrast to that of the conventional example, with FIG. 4(a) illustrating a conventional case, and FIG. 4(b) a case of the embodiment of FIG. 1.

As shown in FIG. 4(a), in the conventional system, since the memory establishes data late, the memory read cycle (data 17a) cannot be completed at the Tc state adding one Tcw state. As a result, the setup time 21a for establishing data becomes longer. Therefore, the time 22a required for executing one cycle also becomes longer.

Figure 4B:
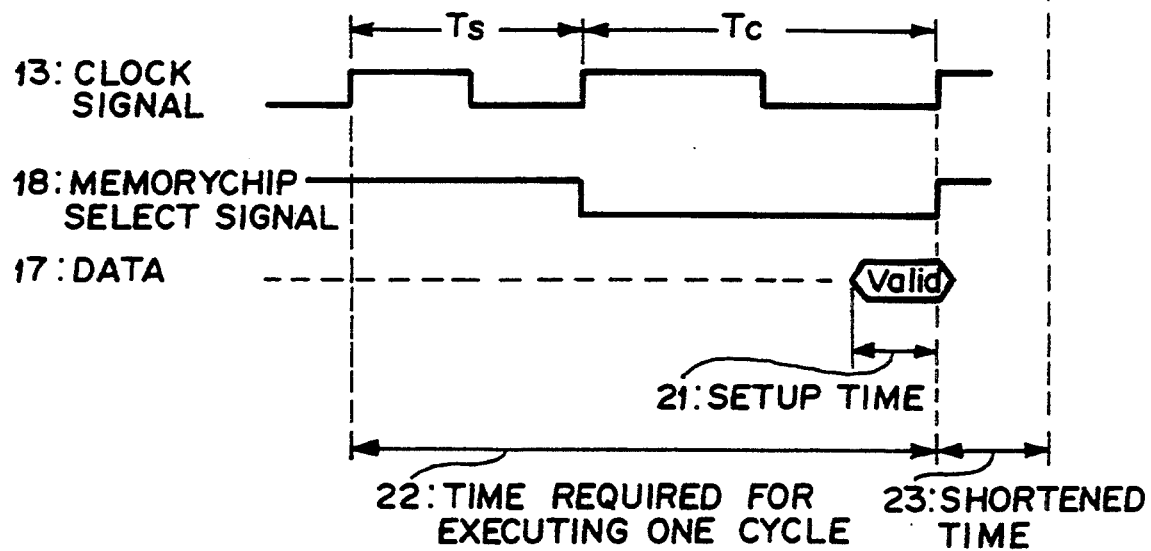

In contrast, in the case of this embodiment according to this invention, as shown in FIG. 4(b), setting up for establishing data is conducted by making the frequency of the clock signal 13 longer as desired so that the memory read cycle (data 17) may be completed at the Tc state. Therefore, it is not necessary to add the Tcw state, and the time 22 required for executing one cycle can be made shorter by time 23.

FIG. 5 illustrates an example in which the memory read cycle is improved by optimizing the duty ratio of the clock signal so as to match the slave. In this embodiment, a memory chip select signal 18b begins to asserts at the point of the clock falling of the command state Tc, specifies a memory address of the slave and prepares reading of that memory area.

Figure 5A:
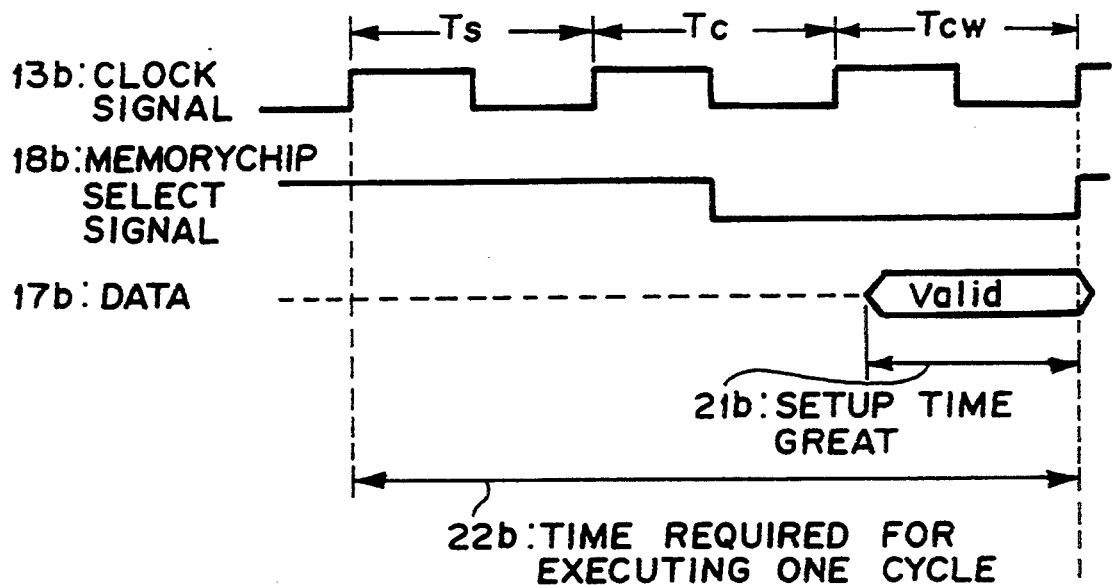
FIG. 5 is a timing chart of the operation as the clock duty ratio is optimized as compared with that of the conventional embodiment, with FIG. 5(a) illustrating a conventional case, and FIG. 5(b) illustrating a case of the embodiment of FIG. 1.

As shown in FIG. 5(a), in the conventional system, the memory read cycle (data 17a) cannot complete setup at the Tc state adding Tcw one, which makes the setup time 21b for establishing data longer. Therefore, the time 22b required for executing one cycle is also made longer.

Figure 5B:
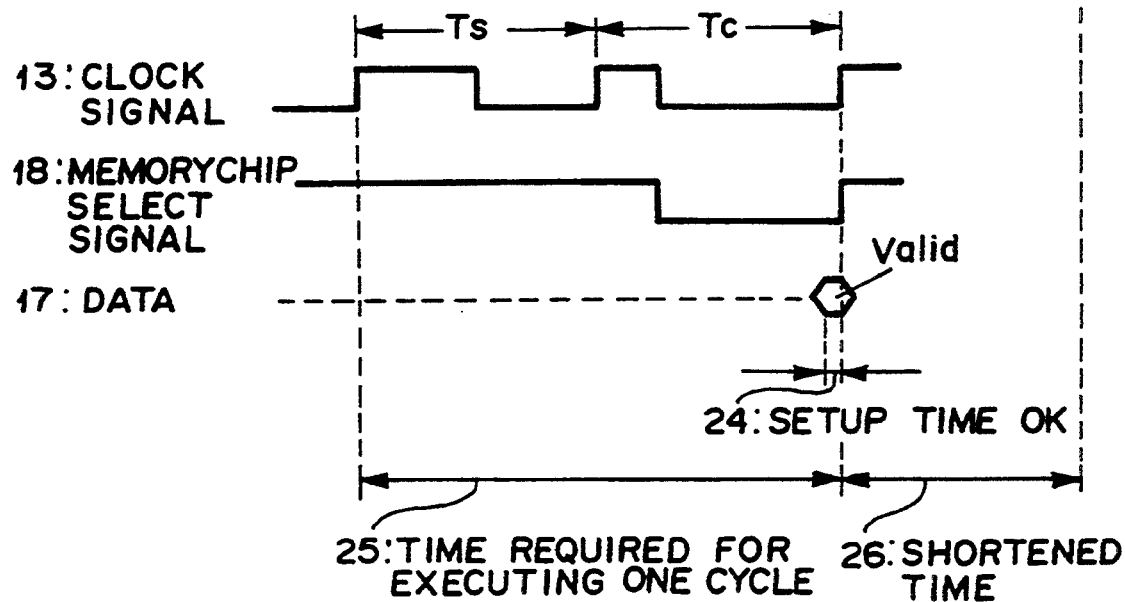

In contrast, in the case of this embodiment, since the memory chip select signal 18 is asserted from the time when the clock signal 13 falls, as shown in FIG. 5(b), the time the memory chip select signal 18 is asserted may be made earlier by changing the ratio (duty ratio) between the high and low levels ("H" and "L" levels) of the clock signal 13 (shortening the "H" level and extending the "L" level) to establish data earlier. The setup time 24 can be set within the command state Tc. Therefore, it is not necessary to add the Tcw state, so that the time 25 required for executing one cycle can be shortened by time 26. Incidentally, although, in the foregoing embodiment, the memory read cycle was described, the optimum clock according to the present invention can also be set for each I/O interface units to which the input and output are controlled, for the write cycle to the memory, for a horizontal scanning frequency of a cathode ray tube unit CRT, or for the read cycle or write cycle to HDD and FDD.

As described above, in the clock generator according to the present invention, a frequency dividing/delay circuit for generating the clock is provided to generate a plurality of system clocks according to the combination of frequency division and the time delay based on a fast-speed basic clock signal to determine according to the address signal from the central processing unit (CPU) what the slave of that operating cycle is to select a system clock of optimum frequency or duty ratio for that slave, so that it becomes possible to shorten the time required for executing one cycle and, hence, to improve the performance of the personal computer.

What is claimed is:

1. A clock generator circuit comprising:
    a basic clock generator for generating a fast-speed basic clock signal;
    a frequency dividing/delay circuit for generating a plurality of system clock signals from said basic clock signal;
    an address decoder to which the address signal from a central processing unit is entered for decoding;
    an address map register connected to said address decoder for storing the optimum clock parameters each corresponding to each address signal, which is the result decoded by said address decoder; and
    a clock selector connected to said frequency dividing/delay circuit and said address map register for selecting a system clock signal of the optimum frequency or duty ratio from among said plurality of system clocks according to the information from said address map register.

2. A clock generator circuit as set forth in claim 1 wherein said frequency dividing/delay circuit generates a plurality of system clock signals by combining a frequency dividing circuit and a delay circuit based on said basic clock signal.

3. A clock generator circuit as set forth in claim 1 wherein said address decoder detects what the slave is going to operate by entering said address signal.

4. A clock generator circuit as set forth in claim 1 wherein said address map register generates parameters such as the frequency dividing number and/or delay time of said frequency dividing/delay circuit from the address signal data which is the result decoded by said address decoder.

5. A clock generator circuit comprising:
    (a) a basic clock generator for generating a fast-speed basic clock signal; and
    (b) a clock generative portion including;
        (1) a frequency dividing/delay circuit for generating a plurality of system clock signals from said basic clock;
        (2) an address decoder to which the address signal from a central processing unit is entered for decoding;
        (3) an address map registers for storing the optimum clock parameters each corresponding to each address signal, which is the result decoded by said address decoder; and (4) a clock selector connected to said frequency dividing/delay circuit and said address map register for selecting a system clock signal of optimum frequency or duty ratio from among said plurality of system clocks according to the information from said address map register.

6. A clock generator circuit as set forth in claim 5 wherein said frequency dividing/delay circuit generates a plurality of system clock signals by combining a frequency dividing circuit and a delay circuit based on said basic clock signal.

7. A clock generator circuit as set forth in claim 5 wherein said address decoder detects what the slave is going to operate by entering said address signal.

8. A clock generator circuit as set forth in claim 5 wherein said address map register generates parameters such as the frequency diving number and/or delay time of said frequency dividing/delay circuit from the address data which is the result decoded by said address generator.

* * * * *